(12) United States Patent
Zeng et al.

(10) Patent No.: US 7,542,479 B2
(45) Date of Patent: Jun. 2, 2009

(54) TRANSFER DEVICE FOR IMPLEMENTING MULTI-PORT SERVICE CONVERGENCE AND METHOD THEREOF

(75) Inventors: Li Zeng, Shenzhen (CN); Jingling Liao, Shenzhen (CN); Xiaohong Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 718 days.

(21) Appl. No.: 10/919,009

(22) Filed: Aug. 16, 2004

(65) Prior Publication Data

US 2005/0036520 A1 Feb. 17, 2005

(30) Foreign Application Priority Data

Aug. 14, 2003 (CN) .................. 03 1 53294

(51) Int. Cl.
*H04J 3/06* (2006.01)
(52) U.S. Cl. ................ 370/466; 370/474; 370/510; 370/395.62; 709/236
(58) Field of Classification Search .............. 370/503, 370/509–515, 412–414, 252, 232, 535–542, 370/465–477, 254; 713/503; 709/236; 398/75, 398/76, 98, 99
See application file for complete search history.

(56) References Cited

U.S. PATENT DOCUMENTS

| | | | | |
|---|---|---|---|---|
| 6,956,847 | B2 * | 10/2005 | Heston et al. ............... | 370/353 |
| 7,068,679 | B1 * | 6/2006 | Brown et al. ............... | 370/468 |
| 7,164,860 | B1 * | 1/2007 | Narvaez et al. ............ | 398/58 |
| 7,227,876 | B1 * | 6/2007 | Cochran et al. ............ | 370/509 |
| 2005/0034009 | A1 * | 2/2005 | Sutardja et al. ............ | 713/503 |

OTHER PUBLICATIONS

ITU-T, Generic Frming Procedure (GFP), G.7041/Y.303, Dec. 2001.*
"ITU-T Recommendation G.7041/Y.1303 Generic framing procedure (GFP)"; ITU-T Recommendation G.7041/Y.1303; XX, XX; Dec. 2001; pp. 1-52; XP002250980.
Steven S. Gorshe, et al.; "Transparent Generic Framing Procedure (GFP): A Protocol for Efficient Transport of Block-Coded Data through SONET/SDH Networks"; IEEE Communications Magazine; IEEE Service Center; Piscataway, US; vol. 40, No. 5; May 2002; pp. 88-95; XP011092831; ISSN: 0163-6804.
Mike Scholten, et al.; "Data Transport Applications Using GFP"; IEEE Communications Magazine; IEEE Service Center; Piscataway, US; vol. 40, No. 5; May 2002; pp. 96-103; XP011092832; ISSN: 0163-6804.

* cited by examiner

*Primary Examiner*—Aung S Moe
*Assistant Examiner*—Habte Mered

(57) ABSTRACT

The present invention discloses a device and method for implementing multi-port service convergence. The device at least comprises a clock & data recovery module, a encapsulating module, a mapping module, a de-mapping module and a decapsulating module, and further comprises at least one branch clock generating and adjusting module for determining transmitting clock frequency information of decapsulated service data and adjusting local branch clock frequency based on the transmitting clock frequency. In the method according to the present invention, firstly the transmitting clock frequency information of service data is extracted, then the service data is transparently encapsulated, the encapsulated data packets are mapped and transmitted; then the received data packets are de-mapped, the de-mapped data packets are decapsulated; the transmitting clock frequency information of the decapsulated service data is determined, and local branch clock frequency is adjusted according to the transmitting clock frequency; at last branch service data is received in terms of the adjusted local branch clock frequency.

7 Claims, 4 Drawing Sheets

TRANSFER DEVICE FOR IMPLEMENTING MULTI-PORT SERVICE CONVERGENCE AND METHOD THEREOF

CROSS-REFERENCE TO RELATED APPLICATIONS

This application claims the benefit of Chinese Patent Application No. 03153294.2 filed on Aug. 14, 2003. The disclosure of the above application is incorporated herein by reference.

FIELD OF THE INVENTION

The present invention relates to Dense Wavelength Division Multiplexing (DWDM) technology, especially to a transfer device for implementing multi-port service convergence and method thereof.

BACKGROUND OF THE INVENTION

With the continuous development of communication technology, services such as data, voices and images can be transmitted through optical fibers. Table 1 shows the major services with transfer speeds at present.

TABLE 1

| Service Name | Transfer Speed Mbps |
| --- | --- |
| Fast Ethernet FE | 125 |
| Gigabits Ethernet GE | 1250 |
| Fiber Distributed Data Interface FDDI | 125 |
| Store Network ESCON | 200 |
| Store Network Fibre Channel/FICON | 1062.5 |
| Digital Video Broadcasting DVB | 270 |
| High-definition Digital TV HDTV | 1485 |
| Asynchronous Transfer Mode ATM | 155/622 |
| Synchronous Digital Transfer STM-1/OC-3 | 155 |
| Synchronous Digital Transfer STM-4/OC-12 | 622 |

If one optical fiber is used to transmit only one service, optical fiber resource will be severely wasted. Currently DWDM system is usually adopted to transmit services, in order to greatly save optical resource. FIG. 1 illustrates the transfer principle of DWDM system in terms of the prior art. Signals are received from the service side by an Optical Transpose Unit (OTU) used for transmitting at the transmitting end. Signal optical carriers with different wavelengths are combined by a wave combining unit and then sent to an optical fiber for transmission. At the receiving end, a wave dividing unit separates the optical carriers, which hold different wavelengths and carry different signals. The OTU used for receiving transmits the received signals to each branch. Accordingly, multiplexing transfer of multi-path optical signals through one optical fiber can be implemented.

Usually there are two transfer modes when using DWDM system to transmit service data:

One transfer mode is to perform transparent transmission for services with arbitrary speed wavelength. After services with nonstandard wavelength are converted to services with standard wavelength matching DWDM system through optical/electrical/optical (O/E/O) manner, transfer of various services is implemented by 3R (Re-sharping, Re-amplifying and Re-timing) technology.

FIG. 2 is a schematic diagram of OTU for implementing transparent transmission for services with arbitrary speed wavelength according to the prior art. The service side is joined with branches and the high-speed line side with high-speed channel. At the transmitting direction, after the received optical signals are converted to electrical signals by a receiving module 201 in OTU, a Clock & Data Recovery module (CDR) 202 extracts clock frequency information from the service data. After converting the electrical signals processed by CDR module 202 to optical signals complying with standards and proper for DWDM system transmission, a transmitting module 203 at the service side sends out the service data utilizing the extracted clock frequency. In like manner, at the receiving direction, after receiving the signals and converting optical signals to electrical signals, a receiving module 204 at the high-speed line side transmits the signals to CDR module 205, the received service data are transmitted to transmitting module 206 at the high-speed line side by CDR module 205 according to the clock frequency of this service data, then sent to corresponding ports after the electrical-optical conversion process by transmitting module 206 at the high-speed line side.

A CDR module can implement data recovery and clock frequency extraction of data services with arbitrary speed, which avoids designing wavelength conversion board with different OTUs for accessing different services in the same system, so that the system is provided with better compatibility. For instance, a CDR module can be designed to support clock frequency extraction of data services with arbitrary speed ranging 10M☐2.7 Gbps. In this way, one OTU can receive or transmit data service with different speed in order to meet requirement of different speed services.

However, this method has the following disadvantages: when a low-speed service is accessed to an OTU, for example 125 Mbps Fast Ethernet (FE), one 125 Mbps will occupy one wavelength resource, so that waveband resource of wavelength is severely wasted. Meanwhile, as the transmitting/receiving modules at the high-speed line side are special modules according with standard wavelength, the cost is very high when using these special modules to transmit low-speed services.

Another transfer mode is to converge the multi-port services. To solve the problem of bandwidth utilization ratio, a general method is to converge several low-speed services to one high-speed channel and then transmit them.

FIG. 3 is a schematic diagram of OTU for implementing multi-port service convergence according to the prior art. Every one port corresponds to a branch, and different branches are used to transmit service data with different speeds, but one branch is only used to transmit service data with constant speed. As for uplink transmitting direction, namely when OTU is transmitting information at service side, taking branch 1 for example, firstly the received optical signals are converted to electrical signals and then transmitted to CDR module 302a for receiving constant speed service by optical-electrical converting module 301a; CDR module 302a for receiving constant speed service extracts clock frequency information of service data from the received service data, then obtains pure service data by removing filling characters or overhead characters in the service data; the pure service data is sent to encapsulation module 304 after being processed by serial-parallel converting module 303a. The encapsulation module 304 encapsulates service data from every port in terms of the pre-defined encapsulation format, which usually contains frame header, frame trailer and channel information convenient for correctly restoring the service data in downlink direction, such regulations as High-level Data Link Control (HDLC), Link Access Procedure-SDH (LAPS), General Frame encapsulation Process (GFP) or other encapsulation formats approved by OTU can be adopted for encapsulation. Then mapping module 305 maps the encapsulated service data to the container of high-speed channel; after parallel-serial converting process and electrical-optical converting process by parallel-serial and electrical-optical converting module 306, the service data is sent out in terms of the high-speed channel clock frequency in high-speed channel transmitting clock module 307. For example, the encapsulated service data can be mapped to the container of a certain transfer format under SDH format, such as container of STM-16 VC3/VC4. In the course of mapping, if bandwidth of the received service is greater than container capacity, multiple containers are lashed together for use; if bandwidth of the received service is smaller than container capacity, filling characters or gap packets are inserted to format of encapsulation definition in order to implement bandwidth adapting.

In the same way, as for downlink transmitting direction, namely when the high-speed line side of the OTU has received information from high-speed channel, firstly the received optical signals are performed with processes of optical-electrical converting, line clock frequency extraction and serial-parallel converting by converting module 308, in order to guarantee that the clock frequency for transmitting data in downlink direction is consistent with that of high-speed channel; then de-mapping module 309 performs de-mapping, namely restoring service data of each branch from high-speed channel container and discarding potential filling characters and gap packets in mapping course at the same time; then decapsulating module 310 performs decapsulation in accordance with encapsulation format, in order to restore the specific service data of each branch. Since in uplink transmitting course, the process such as encapsulating and mapping is not performed to all service data of each branch, but to the pure service data extracted from service data, the clock frequency information of each branch has been totally lost. And in downlink transmitting course, clock frequency of each branch should be the same as that of uplink transmitting course. However, as the clock frequency information of each uplink branch has been totally lost, it is impossible to restore clock frequency information of uplink transmitting course in downlink transmitting course. Under this condition, speed adapting must be performed in decapsulating module 310. Concretely speaking, according to the requirement of different protocols, some gap packets according with regulation of the transmitted service are inserted by speed adapting modules in decapsulating module 310, in order to eliminate frequency deviation. For instance, as to Fibre Channel Protocol service, some idle signals of Fibre Channel can be inserted; as to Synchronous Digital Hierarchy/Synchronous Optical Network (SDH/SONET) service, bit adjusting can be performed. After the service data adjusted by speed adapting module is processed by parallel-serial converting module 312a and electrical-optical converting module 313a, namely after the process of parallel-serial converting and electrical-optical converting, the service data are sent out according to the frequency generated by branch clock generating module 311a of the present branch.

This method also has one disadvantage: since the clock frequency of branch corresponding to each OTU port cannot be transparently transmitted, frequency deviation between transmitting side and receiving side is unable to be recognized. In OTU, the receiving side must perform speed adapting in order to eliminate frequency deviation. However, speed-adapting operation is associated with service types, so it is very difficult to design an OTU which is suitable for an arbitrary speed. Therefore, several common module types are designed, for example: 2×GE is converged to STM-16, 10×ESCON is converged to STM-16, and 4×STM-4 is converged to STM-16. But it proves difficult to make various modules compatible. In this way, the flexibility of OTU is low and it is difficult to implement compounding service transmission. For instance, to implement convergence from 1×GE+1×STM-4 to STM-16 is quite difficult. In order to adapt to various kinds of service convergence, various kinds of OTU modules must be designed to adapt speeds of various kinds of services, which make the system design cost increase. In conclusion, convergence of services with arbitrary speed cannot be implemented with this method, resulting in low flexibility and high cost.

SUMMARY OF THE INVENTION

Therefore, a main object of the present invention is to provide a device for implementing multi-port service convergence, by which convergence of services with arbitrary speeds can be implemented with more flexible application and lower cost.

Another object of the present invention is to provide a method for implementing multi-port service convergence, by which convergence of services with arbitrary speeds can be implemented with more flexible service data transmission and lower transmission cost.

The device according to the present invention comprises an uplink transmitting unit and a downlink transmitting unit, wherein the uplink transmitting unit comprises at least a clock & data recovery module for extracting clock frequency information from branch service data, a encapsulation module for encapsulating the received service data and a mapping module for mapping the encapsulated data packets to a container of high-speed channel which are connected sequentially in series, the downlink transmitting unit comprises a de-mapping module for restoring the data packets from the container of high-speed channel and a decapsulating module for releasing the encapsulating format of data packets and restoring branch data, and the downlink transmitting unit further comprises:

a branch clock generating and adjusting part, for determining a transmitting clock frequency of decapsulated service data, and adjusting a local branch clock frequency based on said transmitting clock frequency so as to make the local branch clock frequency be consistent with the transmitting clock frequency;

said de-mapping module, said decapsulating module and said branch clock generating and adjusting part in the downlink transmitting unit are connected sequentially in series, said clock & data recovery module in the uplink transmitting unit support services with arbitrary speeds.

The branch clock generating and adjusting part in the downlink transmitting unit comprises:

a speed frequency discrimination module located inside the decapsulating module, for determining deviation between the local branch clock frequency at receiving side and the transmitting clock frequency at transmitting side; and a branch clock generating and adjusting module, for generating a local branch clock and adjusting the local branch clock based on the deviation determined by the speed frequency discrimination module so as to make the local branch clock frequency be consistent with the transmitting clock frequency.

Preferably, there is an independent clock & data recovery module, a speed frequency discrimination module and a branch clock generating and adjusting part in each branch. Under this condition, the uplink transmitting unit in this device further comprises:

an optical-electrical converting module in each branch of a plurality of branches, connected to corresponding clock & data recovery module and used for converting the received optical signals to electrical signals;

a serial-parallel converting module in each branch of a plurality of branches, connected between corresponding clock & data recovery module and the encapsulation module and used for converting serial signals to parallel signals;

a parallel-serial and electrical-optical converting module connected to the mapping module and used for performing serial-parallel converting process and optical-electrical converting process for the mapped data packets; and a high-speed channel transmitting clock module connected to the parallel-serial and electrical-optical converting module and used for providing high-speed channel clock.

The downlink transmitting unit further comprises:

an optical-electrical converting, line clock extraction and serial-parallel converting module connected to the de-mapping module and used for performing optical-electrical converting process, line clock extraction and serial-parallel converting process for the received data packets;

a parallel-serial converting module in each branch of a plurality of branches, connected to the decapsulating module and corresponding branch clock generating and adjusting module, and used for performing parallel-serial converting process for the decapsulated branch service data; and an electrical-optical converting module in each branch of a plurality of branches, connected to corresponding parallel-serial converting module and used for performing parallel-serial converting process for the received decapsulated branch service data.

In this device, different branches support process of services with different speeds.

A method for implementing multi-port service convergence according to the present invention at least comprises:

a. after receiving service data with arbitrary speeds from a corresponding port in each branch, extracting transmitting clock frequency information of service data, then transparently encapsulating the service data, mapping the encapsulated data packets to a container of high-speed channel and transmitting the data packets in said container to opposite equipment; and b. after receiving the data packets in the container of high-speed channel from opposite equipment, de-mapping the data packets and then decapsulating the de-mapped data packets; in each branch, determining a transmitting clock frequency of the decapsulated service data, and adjusting the local branch clock frequency based on said transmitting clock frequency so as to make the local branch clock frequency be consistent with the transmitting clock frequency; and then receiving the branch service data according to the adjusted local branch clock frequency.

This method further comprises the step of presetting a buffer with a waterline value, wherein the step of adjusting the local branch clock frequency based on the transmitting clock frequency further comprises:

writing data into the buffer according to the transmitting clock frequency and reading data from the buffer according to the local branch clock frequency, sending the waterline value indicating the difference between writing speed and reading speed to the module for generating local branch clock, said module for generating local branch clock adjusting local branch clock frequency according to the received waterline value.

Preferably, step a further comprises the step of performing optical-electrical conversion for the branch service data before extracting transmitting clock frequency information, and the step of performing electrical-optical conversion for the mapped data packets after the mapping process; step b further comprises the step of performing optical-electrical conversion before the de-mapping process, and the step of performing electrical-optical conversion for the branch service data after the decapsulating process.

Preferably, step a further comprises the step of performing serial-parallel conversion for the branch service data after extracting transmitting clock frequency information and before encapsulating process, and the step of performing serial-parallel conversion for the mapped data packets after the mapping process; step b further comprises the step of performing serial-parallel conversion before the de-mapping process, and the step of performing parallel-serial conversion for the branch service data after the decapsulating process.

The step of transparently encapsulating in step a further comprises:

presetting a buffer and presetting a low threshold value in the buffer; and judging whether the stored data in the buffer reaches the low threshold value, if so, segmenting the data in the buffer according to a predefined length which is less than or equal to the low threshold value and adding frame header for the segmented data; else not segmenting the data in the buffer.

The step of decapsulating in step b further comprises: bounding the start of data area according to the frame header, bounding the end of frame according to the predefined length, and then removing the frame header.

It can be seen from the above-mentioned technical scheme, since the CDR module according to this present invention can process services with arbitrary speeds and the encapsulation implemented in encapsulation module according to this present invention is transparent encapsulation, there is no process of extracting pure service data from service data in uplink transmitting course, but process of encapsulating and mapping the entire service data, so that clock frequency information of uplink branch is reserved.

In downlink direction, since the original clock frequency information of uplink branch is reserved in data packets transmitted in high speed channel, the original clock frequency information of uplink branch can be extracted through de-mapping and decapsulation; and through the operation of frequency discrimination to clock frequency which is implemented in frequency discrimination module, downlink branch clock frequency and uplink branch clock frequency are kept in complete uniformity. In this way, clock frequency information of uplink branch and downlink branch is guaranteed to be consistent. Therefore the service data written by uplink branch can be normally read out, without speed adapting process in the prior art, accordingly further eliminating the drawback of disability to process services with arbitrary speeds due to requirement of speed adapting process in prior art, implementing convergence process to services with arbitrary speed, elevating the flexibility of service convergence and decreasing the cost.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Now, the present invention will be described in detail hereinafter with reference to the accompanying drawings.

Figure 1:
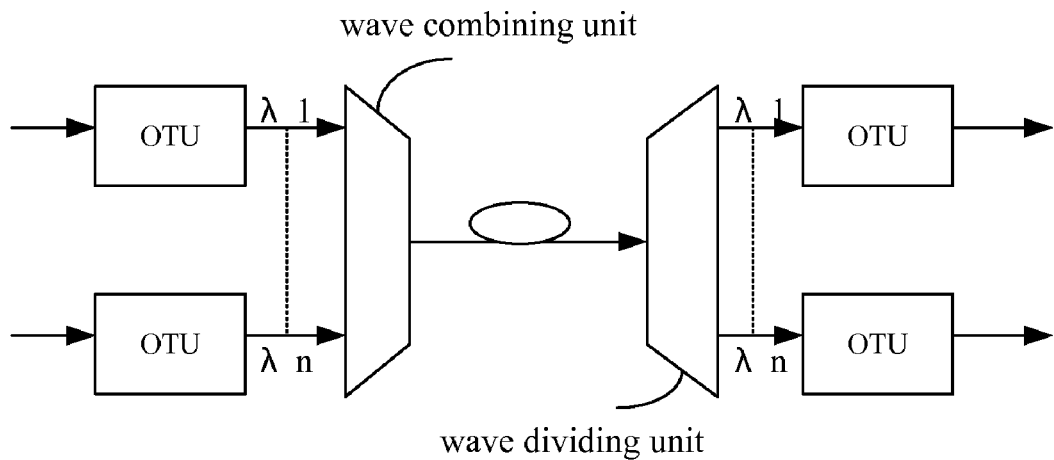
FIG. 1 is a schematic diagram illustrating transfer principle of DWDM system according to the prior art.
Figure 2:
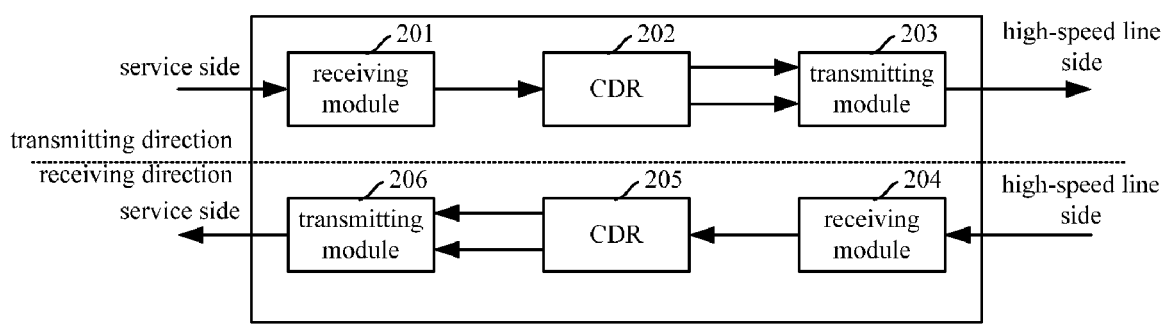
FIG. 2 is a schematic diagram illustrating an OTU for implementing transparent transmission for services with arbitrary speed wavelength according to the prior art.
Figure 3:
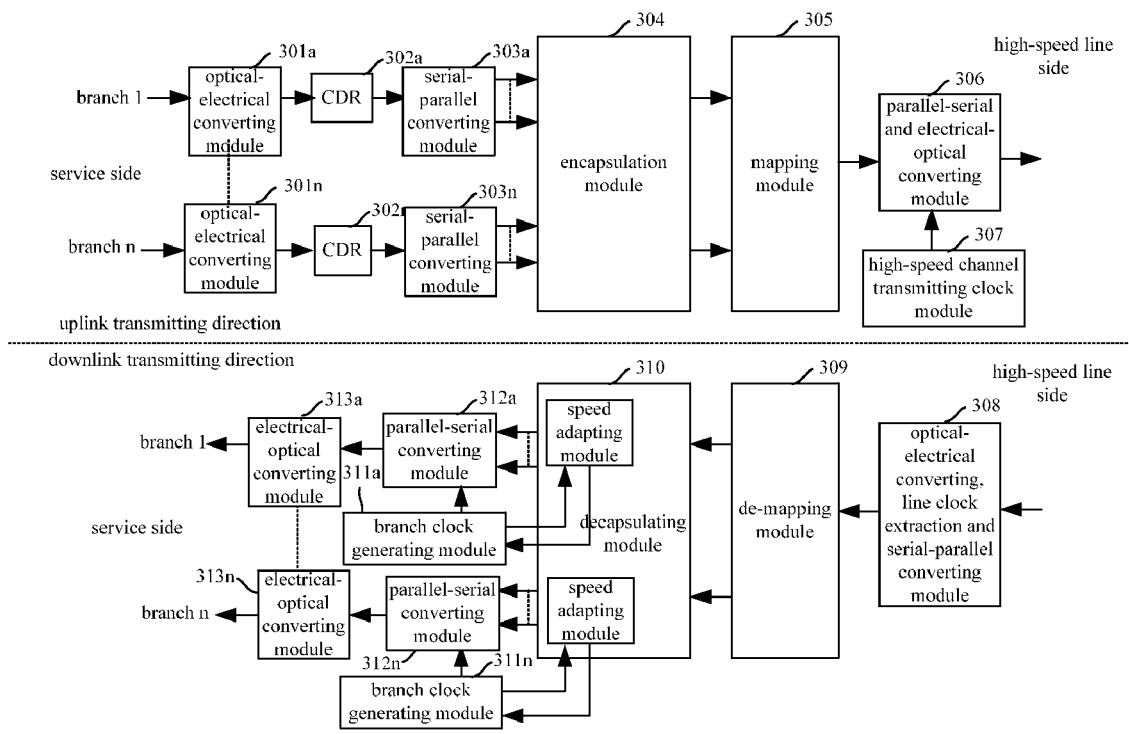
FIG. 3 is a schematic diagram illustrating an OTU for implementing multi-port service convergence according to the prior art.
Figure 4:
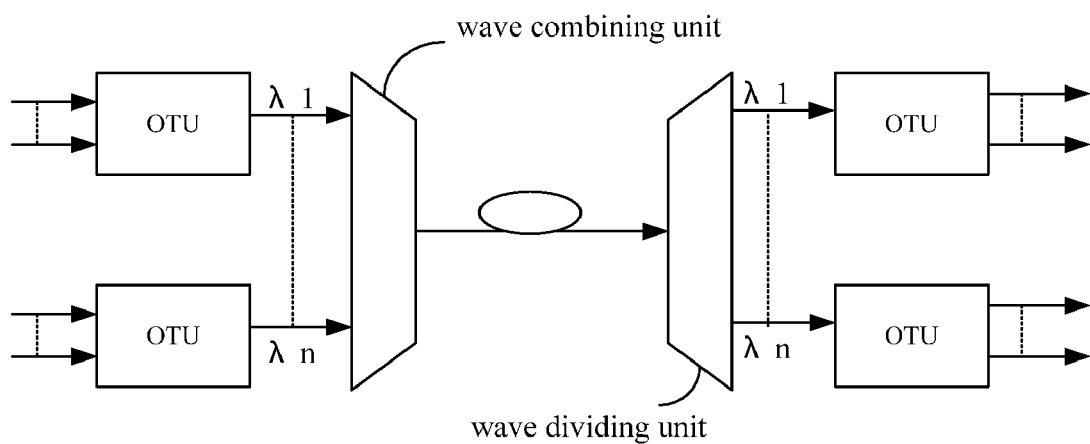
FIG. 4 is a schematic diagram illustrating transfer principle of DWDM system according to the present invention.

FIG. 4 is a schematic diagram illustrating transfer principle of DWDM system according to the present invention. Every OTU for transmitting can simultaneously receive service data with arbitrary speeds from multiple ports, converge the received data, and then sends the service data to a high-speed channel through a wave combining unit. After receiving the data sent by high-speed channel, the OTU for receiving directly distributes the received service data with different speeds to each corresponding port, without the need of speed adapting.

Figure 5:
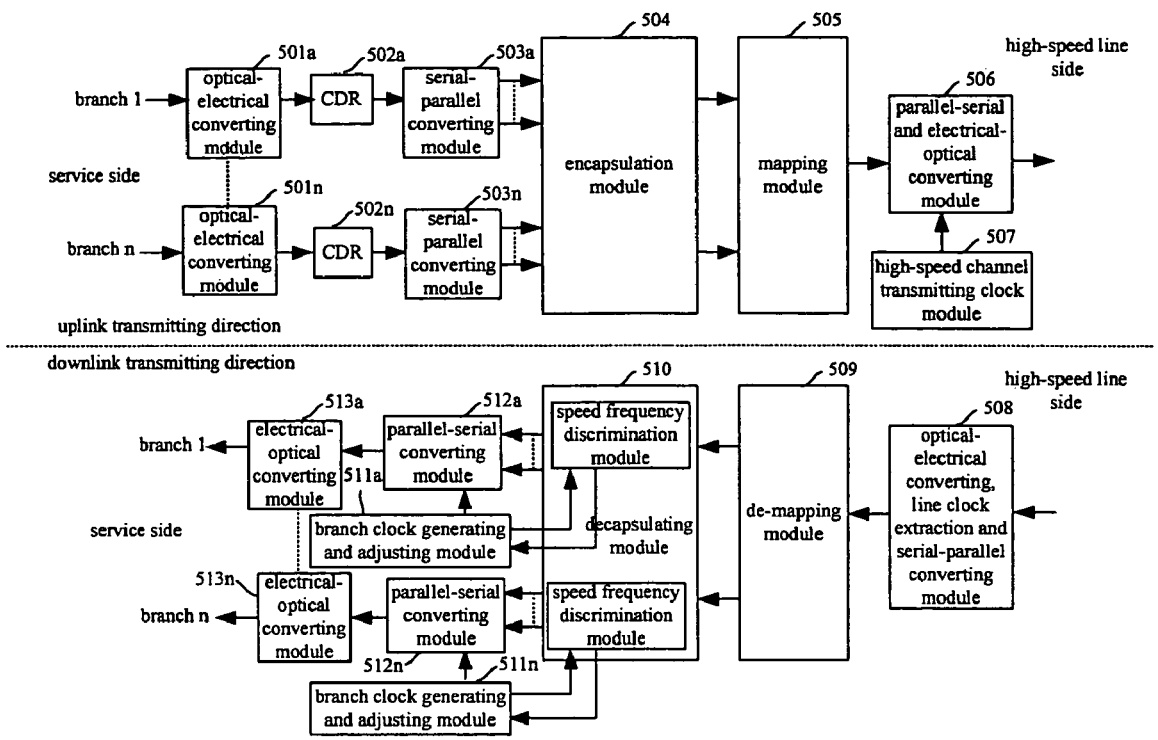
FIG. 5 is a schematic diagram illustrating an OTU for converging the services with arbitrary speed received from multi-ports according to the present invention.

FIG. 5 is a schematic diagram illustrating an OTU for converging the services with arbitrary speed received from multi-ports according to the present invention. Each port corresponds to one branch and different branches can be used to transmit service data with different speeds which can be arbitrary speeds. It can be seen from FIG. 5 that this OTU consists of an uplink transmitting unit and a downlink transmitting unit, where uplink transmitting means sending information of service side and downlink transmitting means receiving information at the service side. The uplink transmitting unit comprises at least an optical-electrical converting module 501, a CDR 502, a serial-parallel converting module 503, an encapsulation module 504, a mapping module 505 and a parallel-serial and electrical-optical converting module 506, which are connected sequentially in series, together with a high-speed channel transmitting clock module 507 connected to the parallel-serial and electrical-optical converting module 506; as there are more than one branch on service side, namely branch 1 to branch n, correspondingly there are one optical-electrical converting module 501, one CDR 502 and one serial-parallel converting module 503 in each branch, namely optical-electrical converting modules 501*a*~501*n*, CDR 502*a*~502*n*, serial-parallel converting modules 503*a*~503*n*. The downlink transmitting unit comprises at least an optical-electrical converting, line clock extraction and serial-parallel converting module 508, a de-mapping module 509, a decapsulating module 510, a parallel-serial converting module 512 and an electrical-optical converting module 513, which are connected sequentially in series, together with branch clock generating and adjusting module 511 which is simultaneously connected to parallel-serial converting module 512 and decapsulating module 510. Similar to uplink transmitting direction, as there are more than one branch on service side, namely branch 1 to branch n, there are optical-electrical converting modules 511*a*~511*n*, CDR 512*a*~512*n* and serial-parallel converting modules 513*a*~513*n* corresponding to each branch.

In this device, optical-electrical converting module 501 and electrical-optical converting module 513 can be combined together, forming one optical-electrical converting module having the function of two-way optical-electrical conversion; in the same way, serial-parallel converting module 503 and parallel-serial converting module 512 can be combined together, parallel-serial and electrical-optical converting module 506 together with optical-electrical converting, line clock extraction and serial-parallel converting module 508 can be combined. Similarly, encapsulation module 504 and decapsulating module 510, as well as mapping module 505 and de-mapping module 509 can be respectively physically integrated into one module with two-way working function.

In the OTU according to the present invention, CDR 502 supports clock extraction and data restore for services with arbitrary speeds. In encapsulation module 504 all services are transparently encapsulated, unlike the prior art in which only pure service data are extracted in encapsulation course and the filling characters or overhead characters of the original service data are discarded. So in the present invention, the clock frequency information of uplink branch is reserved in encapsulation course, unlike the prior art in which the clock frequency information of uplink branch is lost because idle signals are discarded. Because the clock frequency information of uplink branch is reserved in encapsulated data, the clock frequency information of this uplink branch can be restored from the decapsulated data, branch clock generating and adjusting module 511 adjusts clock of downlink branch according to this clock frequency information of uplink branch, making the reading speed and writing speed consistent. Accordingly, there is no need of speed adapting when reading data, avoiding the disadvantage of being unable to implement convergence of services with arbitrary speeds due to need of speed adapting in the prior art. Being able to implement convergence for services with arbitrary speeds, the OTU according to the present invention is entitled with advantages of flexible application and low cost.

The above description is about the device according to this present invention. The following is illustration of the processing procedure in terms of the method according to this present invention.

As for uplink transmitting direction, namely when OTU is transmitting information at service side, taking branch 1 for example, firstly the received optical signals are converted to electrical signals and then transmitted to CDR module 502*a* by optical-electrical converting module 501*a*, where the CDR module can receive service data with arbitrary speeds. CDR module 502*a* extracts clock frequency information of the service data from the received service data; the service data is sent to encapsulation module 504 after being processed by serial-parallel converting module 503*a*. The encapsulation module 504 encapsulates the received service data according to the sequence of bit flow, for instance in accordance with format of GFP protocol. It is necessary to specify that unlike the prior art, the encapsulation performed by encapsulation module 504 is transparent encapsulation, namely the encapsulated service data includes not only pure service data, but also idle characters or overhead characters in the original service data. Specific method of transparent encapsulation will be particularly described later on.

After performing transparent encapsulation for service data, encapsulation module 504 sends the encapsulated data packets to mapping module 505. Mapping module 505 maps the encapsulated data packets to the container of high-speed channel, such as container VC3/VC4 of STM-16; after parallel-serial converting process and electrical-optical converting process by parallel-serial and electrical-optical converting module 506, the service data is sent out to opposite equipment in terms of the high-speed channel clock frequency in high-speed channel transmit clock module 507. In the course of mapping, if bandwidth for receiving service is greater than container capacity, multiple containers are lashed together for use; if receiving service bandwidth is smaller than container capacity filling characters or gap packets are inserted to format of encapsulation definition in order to implement bandwidth adapting.

As for downlink transmitting direction, namely when OTU has received information at service side, firstly the optical signals received from opposite equipment are performed with processes of optical-electrical converting, line clock frequency extraction and serial-parallel converting by converting module 508, in order to guarantee that the clock frequency for transmitting data in downlink direction is consistent with that of high-speed channel. Then de-mapping module 509 performs de-mapping, namely restoring service data of each branch from high-speed channel container and discarding the filling characters and gap packets in mapping course at the same time. Then the decapsulating module 510 performs decapsulation in accordance with encapsulation format, in order to restore the specific service data of each branch. Specific process of decapsulation will be particularly described together with transparent encapsulation later on.

After decapsulating module 510 has decapsulated the service data, since there is deviation between clock of local branch and clock of transmitting side, a service speed frequency discrimination module is set corresponding to each branch. Each frequency discrimination module equals a buffer and the decapsulated service data are put into this frequency discrimination module. Because there is speed deviation between writing in service data at transmitting side and reading out service data at receiving side, it is inevitable that service data in speed frequency discrimination module will show waterline variation. According to this changing waterline value, branch clock generating and adjusting module 511 at the receiving side performs corresponding adjustment, in order to eliminate frequency deviation between receiving side and transmitting side, making the clock frequency of branch at receiving side track the clock frequency of receiving service at transmitting side ever and again, namely making the clock frequency of reading service data equals the clock frequency of writing service in uplink direction. At last, after the received service data is processed by parallel-serial converting module 512a and electrical-optical converting module 513a, namely after the process of parallel-serial converting and electrical-optical converting, the service data are sent out according to the frequency of the present branch.

Figure 6:
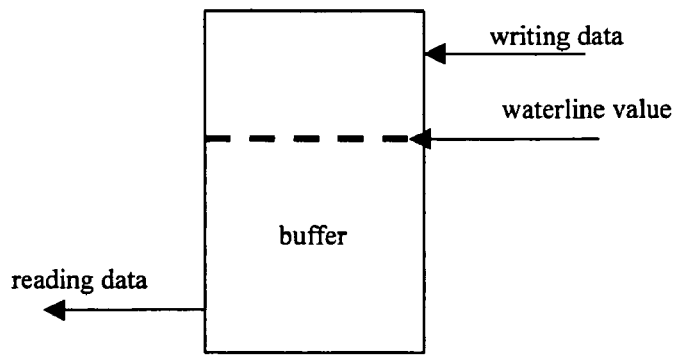
FIG. 6 is a schematic diagram illustrating a speed frequency discrimination module according to the present invention.

FIG. 6 is a schematic diagram illustrating a speed frequency discrimination module according to the present invention. The speed frequency discrimination module equals a buffer for adjusting frequency deviation between the transmitting side and the receiving side. There is a pre-set standard waterline value in each speed frequency discrimination module. If the clock frequency of the transmitting side is greater than that of receiving side, the de-mapped service data written into speed frequency discrimination module is relatively excessive, and the waterline value concerning data change is greater than standard waterline value. In this time, the waterline value will be sent to corresponding branch clock generating and adjusting module 511 through the data bus between the speed frequency discrimination module and the branch clock generating and adjusting module 511. Then, the branch clock generating and adjusting module 511 makes corresponding adjustment according to the variation of waterline value, namely expedites the clock frequency of corresponding branch to make the changing waterline value in this speed frequency discrimination module close to standard waterline value, in order to eliminate frequency deviation; similarly, if the clock frequency of the transmitting side is smaller than that of receiving side, the de-mapped service data written into speed frequency discrimination module is relatively less, and the waterline value concerning data change is smaller than standard waterline value. In this time, the branch clock of receiving side performs corresponding adjustment according to the variation of waterline value, namely decreases the clock frequency of corresponding branch to make the changing waterline value in this speed frequency discrimination module close to standard waterline value, in order to eliminate frequency deviation. In this way, the reading speed and writing speed of branch are guaranteed to be consistent, and transparent transmission of branch clock frequency will be realized.

Figure 7:
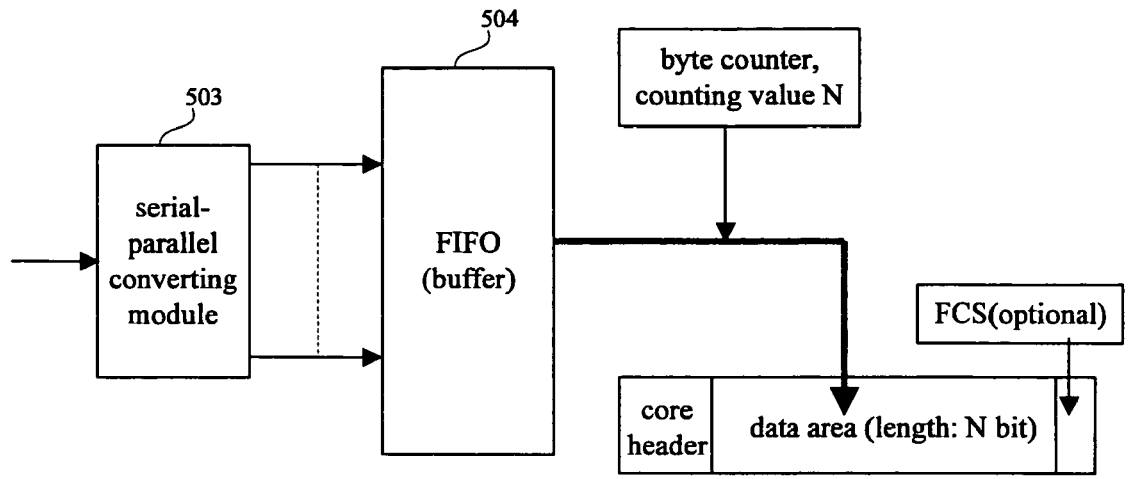
FIG. 7 is a schematic diagram illustrating transparent encapsulation in accordance with the present invention.

FIG. 7 is a schematic diagram illustrating transparent encapsulation in accordance with the present invention, taking GFP encapsulation for example. The serial electrical signals at service-receiving side are converted to parallel signals by serial-parallel converting module 503, and then the converted signals are sent to encapsulation module 504 for processing. In fact encapsulation module 504 is a FIFO buffer. Meanwhile a byte counter is set, and counting value N is the length of data area with the encapsulated frame. The counting value N is set according to the relationship of effect and cost in practical transmission, so N varies with different services, but it is constant and invariable in the transmitting process of the same service.

In order to guarantee the continuity of the transferred data between packets, control through buffer is necessary, and it is required that the mapping bandwidth be larger than the basic data speed of client data before being encoded. A low threshold value is set in the FIFO buffer 504, after the stored data in FIFO reaches the low threshold value, in terms of the first-in-first-out principle, the data in FIFO buffer is sliced according to the current counting value N in order to guarantee the continuity of data between frames. The sliced data is added with a core header and a payload field header, thereby encapsulation for the data can be implemented. The data without being sliced in the buffer will be combined and processed in the next slicing course.

Figure 8:
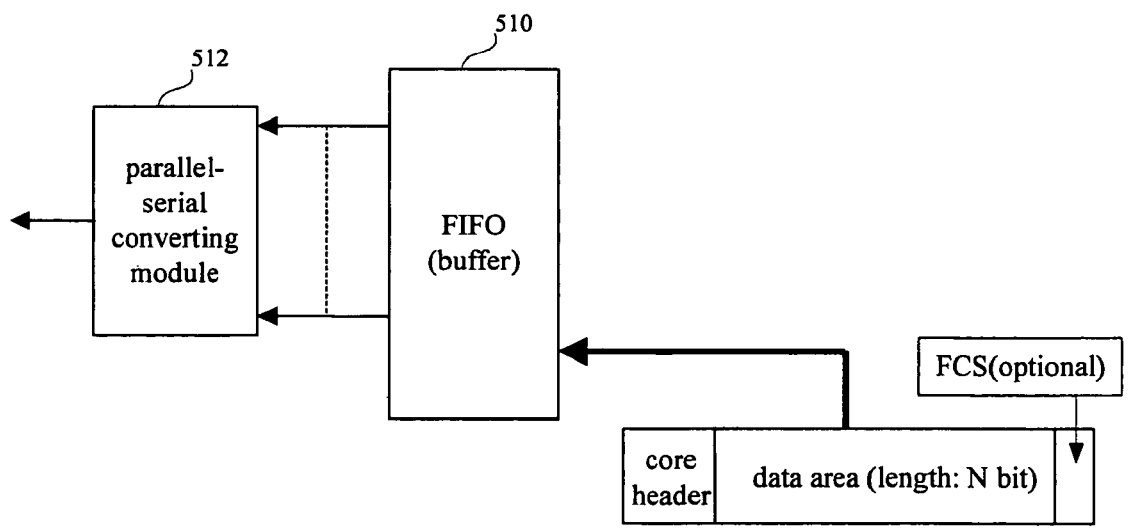
FIG. 8 is a schematic diagram illustrating the process of decapsulating the transparently encapsulated data packets in accordance with the present invention.

FIG. 8 is a schematic diagram illustrating the process of decapsulating the transparently encapsulated data packets in accordance with the present invention. As for GFP protocol, after the sending terminal receives the data frames from the outlying terminal, the start of data area is bounded through core header, the end of the frame is bounded according to the data length N, then core header and payload header is removed, the received data is sent to the decapsulation module 510 which is a FIFO buffer actually. Since the idle frame data has already been recognized and discarded before being stored in buffer 510, the data stored in buffer 510 is pure payload data. The data stream, in terms of FIFO principle, is converted from parallel data to series data through parallel-series converting module 512 and then sent out.

In terms of the present invention, if the electrical signals are directly received by the OTU, there is no need for processes such as optical-electrical converting and electrical-optical converting, and accordingly optical-electrical converting module is not needed. If the present invention is applied in a low-speed situation, the signals can be directly processed without performing serial-parallel converting and parallel-serial converting, and accordingly serial-parallel converting module is not needed.

While the invention has been shown and described with reference to a preferred embodiment thereof, it will be understood by those skilled in the art that various changes in form and details may be made therein without departing from the spirit and scope of the invention as defined by the appended claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for implementing convergence of multi-port services with arbitrary speeds, comprising an uplink transmitting unit and a downlink transmitting unit, wherein the uplink transmitting unit comprises at least a clock & data recovery module for extracting clock frequency information from service data of each of branches, an encapsulation module for encapsulating the service data into data packets without discarding any bit of the original service data and without discarding any bit of the overhead or filling characters associated with the original service data including bits for the idle signal and clock frequency information, and a mapping module for mapping the data packets to a container of high-speed channel which are connected sequentially in series, the downlink transmitting unit comprises a de-mapping module for restoring data packets mapped from the container of high-speed channel and a decapsulating module for decapsulating data packets de-mapped and restoring branch data, and the downlink transmitting unit further comprises:

a branch clock generating and adjusting part, for determining a transmitting clock frequency of the service data decapsulated, and adjusting a local branch clock frequency based on the transmitting clock frequency so as to make the local branch clock frequency be consistent with the transmitting clock frequency;

the de-mapping module, the decapsulating module and the branch clock generating and adjusting part in the downlink transmitting unit being connected sequentially in series, said clock & data recovery module in the uplink transmitting unit supporting services with arbitrary speeds;

wherein the branch clock generating and adjusting part adjusting the local branch clock frequency based on the transmitting clock frequency so as to make the local branch clock frequency be consistent with the transmitting clock frequency comprises:

writing the service data decapsulated into a buffer according to the transmitting clock frequency, reading the service data decapsulated from the buffer according to the local branch clock frequency, obtaining waterline value of the buffer indicating the difference between writing speed and reading speed, and adjusting the local branch clock frequency according to the waterline value.

2. The device of claim 1, the uplink transmitting unit further comprising:

an optical-electrical converting module in each branch of a plurality of branches, connected to the clock & data recovery module and used for converting the received optical signals to electrical signals;

a serial-parallel converting module in each branch of a plurality of branches, connected between the clock & data recovery module and the encapsulation module and used for converting serial signals to parallel signals;

a parallel-serial and electrical-optical converting module connected to the mapping module and used for performing serial-parallel converting process and optical-electrical converting process for the data packets mapped; and a high-speed channel transmitting clock module connected to the parallel-serial and electrical-optical converting module and used for providing high-speed channel clock;

the downlink transmitting unit further comprising:

an optical-electrical converting, line clock extraction and serial-parallel converting module connected to the de-mapping module and used for performing optical-electrical converting process, line clock extraction and serial-parallel converting process for the data packets de-mapped;

a parallel-serial converting module in each branch of a plurality of branches, connected to the decapsulating module and the branch clock generating and adjusting module, and used for performing parallel-serial converting process for the service data decapsulated; and an electrical-optical converting module in each branch of a plurality of branches, connected to the parallel-serial converting module and used for performing electrical-optical converting process for the service data decapsulated.

3. The device of claim 1, wherein the different branches support process of services with different speeds.

4. A method for implementing convergence of multi-port services with arbitrary speeds, at least comprising:

a. after receiving service data with arbitrary speeds from a port in each branch, extracting transmitting clock frequency information of the service data, then transparently encapsulating the service data into data packets without discarding any bit of the original service data and without discarding any bit of the overhead or filling characters associated with the original service data including bits for the idle signal and clock frequency information bit mapping the data packets to a container of high-speed channel and transmitting the data packets mapped in the container to opposite equipment; and b. after receiving the data packets mapped in the container of high-speed channel, de-mapping the data packets mapped and then decapsulating data packets de-mapped; in each branch, determining a transmitting clock frequency of service data decapsulated, and adjusting local branch clock frequency based on the transmitting clock frequency so as to make the local branch clock frequency be consistent with the transmitting clock frequency; and then receiving the service data decapsulated according to the adjusted local branch clock frequency;

wherein the step of adjusting the local branch clock frequency based on the transmitting clock frequency further comprises:

writing the service data decapsulated into a buffer according to the transmitting clock frequency, reading the service data decapsulated from the buffer according to the local branch clock frequency, obtaining the waterline value of the buffer indicating the difference between writing speed and reading speed, and adjusting the local branch clock frequency according to the waterline value.

5. The method of claim 4, step a further comprising the step of performing optical-electrical conversion for the service data before extracting transmitting clock frequency information, and the step of performing electrical-optical conversion for the data packets mapped after the mapping process; the step b further comprising the step of performing optical-electrical conversion before the de-mapping process, and the step of performing electrical-optical conversion for the service data decapsulated after the decapsulating process.

6. The method of claim 4, step a further comprising the step of performing serial-parallel conversion for the service data after extracting transmitting clock frequency information and before the encapsulating process, and the step of performing serial-parallel conversion for the data packets mapped after the mapping process; the step b further comprising the step of performing serial-parallel conversion before the de-mapping process, and the step of performing parallel-serial conversion for the service data decapsulated after the decapsulating process.

7. The method of claim 4, wherein the step of transparently encapsulating in step a further comprises:

presetting a buffer and presetting a low threshold value in the buffer;

judging whether the service data decapsulated in the buffer reaches the low threshold value, if so, segmenting the service data decapsulated in the buffer according to a predefined length which is less than or equal to the low threshold value and adding frame header for service data segmented; else not segmenting the service data decapsulated in the buffer;

wherein the decapsulating process in the step b further comprises: bounding the start of data area of a frame of the service data decapsulated according to frame header of the frame, bounding the end of the data area of the frame according to the predefined length, and then removing the frame header.

* * * * *